United States Patent
Zhang et al.

(10) Patent No.: US 11,324,068 B2
(45) Date of Patent: May 3, 2022

(54) DATA TRANSMISSION METHOD AND DEVICE, AND STORAGE MEDIUM

(71) Applicants: Sharp Kabushiki Kaisha, Sakai (JP); FG Innovation Company Limited, New Territories (HK)

(72) Inventors: Chongming Zhang, Shanghai (CN); Renmao Liu, Shanghai (CN); Chao Luo, Shanghai (CN); Ningjuan Chang, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/760,695

(22) PCT Filed: Nov. 8, 2018

(86) PCT No.: PCT/CN2018/114559
§ 371 (c)(1),
(2) Date: Apr. 30, 2020

(87) PCT Pub. No.: WO2019/091424
PCT Pub. Date: May 16, 2019

(65) Prior Publication Data
US 2020/0351974 A1     Nov. 5, 2020

(30) Foreign Application Priority Data
Nov. 8, 2017   (CN) .......................... 201711094429.1

(51) Int. Cl.
*H04W 76/27*     (2018.01)
*H04W 28/06*     (2009.01)

(52) U.S. Cl.
CPC ........... *H04W 76/27* (2018.02); *H04W 28/06* (2013.01)

(58) Field of Classification Search
CPC ..... H04W 12/02; H04W 36/00; H04W 76/27; H04W 28/06
See application file for complete search history.

(56) References Cited

U.S. PATENT DOCUMENTS

| | | | |
|---|---|---|---|
| 2017/0311290 A1* | 10/2017 | Adjakple | H04W 76/18 |
| 2018/0083688 A1* | 3/2018 | Agiwal | H04W 12/04 |
| 2018/0213575 A1* | 7/2018 | Chen | H04W 76/27 |
| 2018/0220487 A1* | 8/2018 | Wu | H04W 76/27 |
| 2018/0270792 A1* | 9/2018 | Park | H04W 68/025 |
| 2018/0302914 A1* | 10/2018 | da Silva | H04W 72/1289 |

(Continued)

OTHER PUBLICATIONS

Official Communication issued in International Patent Application No. PCT/CN2018/114559, dated Jan. 31, 2019.

(Continued)

*Primary Examiner* — Syed Ali
(74) *Attorney, Agent, or Firm* — Keating & Bennett, LLP

(57) ABSTRACT

Embodiments of the present disclosure provide a method for transmitting data at user equipment (UE), comprising receiving a first RRC connection resume request instructing to resume an RRC connection; and reestablishing a packet data convergence protocol (PDCP) layer based on the first RRC connection resume request. The embodiments of the present disclosure further provide a device for transmitting data and a storage medium.

2 Claims, 3 Drawing Sheets

(56) References Cited

U.S. PATENT DOCUMENTS

2019/0342804 A1* 11/2019 Futaki .................. H04W 36/14

OTHER PUBLICATIONS

Huawei et al., "Introduction of Voice and Video enhancements for LTE", 3GPP TSG-RAN2 Meeting #97, R2-1702413, Feb. 13-17, 2017, 71 pages.
Ericsson, "draft CR for RRC Connection Suspend and Resume", 3GPP TSG-RAN WG2 Meeting #93, R2-161744, Feb. 15-19, 2016, 21 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, pp. 1-753.
Huawei et al., "New WID on Further NB-IoT enhancements", #3GPP TSG RAN Meeting #75, RP-170852, Mar. 6-9, 2017, 6 pages.
Intel Corporation, "Early data transmission discussion for eFeMTC and FeNB-IoT", 3GPP TSG RAN WG2 Meeting #99bis, R2-1710642, Oct. 9-13, 2017, 7 pages.
Ericsson, "UP solution for early data transmission", 3GPP TSG-RAN WG2 Meeting #99bis, R2-1710522, Oct. 9-13, 2017, 5 pages.
Ericsson, "Bearer Setup and Security Considerations for Early Data in NB-IoT", 3GPP TSG-RAN WG2 #99, R2-1708631, Aug. 21-25, 2017, pp. 1-5.
Ericsson, "Security solution for Suspend/Resume in Light Connection", 3GPP TSG-RAN WG2 #97, Tdoc R2-1702021, Feb. 13-17, 2017, 11 pages.

* cited by examiner

DATA TRANSMISSION METHOD AND DEVICE, AND STORAGE MEDIUM

TECHNICAL FIELD

The present invention relates to the field of wireless communications technology. More specifically, the present invention relates to a data transmission method and a corresponding device, and a storage medium.

BACKGROUND

With the rapid growth of mobile communications and great progress of technology, the world is moving toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

In order to better implement the Internet of Everything, a new work project (see non-patent literature: RP-170852 New WID on Further NB-IoT enhancements) was established at the 3GPP RAN #75 plenary meeting held in March 2017. The project aims to further enhance the NB-IoT system, and puts forward requirements for further reducing data transmission latency.

In the prior art, UE may be in an idle state or a connected state depending on whether the UE has an air interface connection. When the UE has data to transmit, preferably the UE needs to enter the connected state from the idle state first. In order to reduce data transmission latency, an intermediate state is introduced. In this state, although the UE is in a disconnected idle state on an air interface, an access stratum context (AS context) of the UE is stored in a base station and the UE; and the UE is assigned a resume ID, which is an identity used by the UE to resume an RRC connection. This intermediate state can be considered as a connection suspended state, or it can be considered as a connection inactive state. In this intermediate state, the UE is in fact in a disconnected state on the air interface; yet, the connection between the UE and a core network may be in an active state or in a suspended state. When the UE has data to transmit, the UE sends to the base station an RRC connection resume request message carrying the resume ID. After receiving the request, the base station can quickly instruct, based on a previous configuration, the UE to enter the connected state so as to transmit the data.

In order to further reduce data transmission latency, early data transmission (EDT) currently in discussion is attempting to enable the UE to transmit data packets in the disconnected state and prevents the UE from entering the connected state. One implementation of this scheme is that the UE is in the aforementioned suspended or inactive state. In this state, the UE can transmit already generated data packets to the base station while initiating an RRC connection resume request. One implementation manner may be that the data packets to be transmitted and the RRC connection resume request message to be transmitted to the base station are transmitted on the same uplink resources; or it may be that the base station schedules for or allocates to the UE uplink resources for transmitting the data packets and uplink resources for transmitting the RRC connection resume request message. Once the base station accepts the request of the UE, the base station can restore the context of the UE and transmit the data packets to the corresponding core network according to the context. If there is no subsequent data exchange, the base station can instruct the UE to enter the suspended state again. Thus, the UE can complete data transmission without entering the connected state, greatly reducing transmission latency.

Data transmission in the connected state is guaranteed to be secure. That is, the data transmitted over the air interface needs to be encrypted before transmission. After the RRC connection is established, the UE and the base station interact to determine which encryption method to use, and ensure that encrypted input is synchronized before the encryption method is used. The base station can only correctly decrypt the received data packets through this way.

In the prior art, a data packet encryption is performed at a PDCP layer. When the UE generates PDCP PDUs, a COUNT value is used as the input for a security algorithm to encrypt data packets. The COUNT value consists of an HFN and a PDCP SN corresponding to the data packets. The COUNT value changes each time a data packet is generated. When receiving the data packets transmitted by the UE, the base station can only decrypt the same correctly if the same COUNT value used when the UE performs the encryption is inputted. That is, the base station and the UE need to maintain synchronization on the COUNT values in order to correctly decrypt the data packets.

In order to achieve secure transmission of EDT, the UE is allowed to initiate an encryption procedure before data transmission, i.e., without having any interaction with the base station. In the connected state, the UE can always synchronize the COUNT values with the base station. However, in the suspended or inactive state, since the UE and the base station have no connection on the air interface, the next data transmission will be affected once the COUNT value is not synchronized. When the base station does not correctly receive a data packet transmitted by means of EDT, it is possible to cause the COUNT values to be out of synchronization. When the UE initiates EDT again, the base station may be unable to decrypt the data packets due to the out-of-sync COUNT value, which in turn leads to another data transmission failure.

Therefore, it is desired to have a technical solution that may prevent such data transmission failure due to out-of-sync COUNT values.

SUMMARY

In order to solve at least some of the aforementioned problems, embodiments of the present invention provide a method and a device for transmitting data, and a storage medium.

According to one aspect of the present invention, a method for transmitting data at user equipment (UE) is provided, the method comprising: receiving a first radio resource control (RRC) connection resume request instructing to resume an RRC connection, and reestablishing a packet data convergence protocol (PDCP) layer based on the first RRC connection resume request.

Reestablishing the PDCP layer enables the UE and, for example, a base station to perform confidential operations by using an agreed encrypted input, solving a decoding failure caused by out-of-sync COUNT values of the UE and the base station.

In some examples, the method may further comprise transmitting to a network side device a second RRC connection resume request for resuming the RRC connection.

The reestablishing a PDCP layer based on the first RRC connection resume request may comprise: if the first RRC connection resume request involves data transmission, performing the reestablishment of the PDCP layer before the second RRC connection resume request for resuming the RRC connection is transmitted to the network side device. The reestablishing a PDCP layer based on the first RRC connection resume request may further comprise: if the first RRC connection resume request does not involve data transmission, performing the reestablishment of the PDCP layer after the second RRC connection resume request for resuming the RRC connection is transmitted to the network side device.

In some examples, the reestablishment of the PDCP layer may comprise: restoring a state of the PDCP layer, and reestablishing a PDCP entity for a data radio bearer and/or a signaling radio bearer.

In some examples, the method may further comprise: resetting header compression protocol content for a data radio bearer configured with header compression.

In some examples, the method may further comprise reestablishing the PDCP layer upon occurrence of the following cases: a related timer for controlling RRC connection resume expires; a cell reselection occurs during RRC connection resume; a response refusing to resume the RRC connection is received from the network side device.

According to another aspect of the embodiments of the present invention, a device for transmitting data is provided. The device comprises an instruction receiving module and an RRC connection resume module. The instruction receiving module is configured to receive a first RRC connection resume request instructing to resume an RRC connection. The RRC connection resume module is configured to reestablish a PDCP layer based on the first RRC connection resume request.

In some examples, the device may further comprise: a transmission module, configured to transmit to a network side device a second RRC connection resume request for resuming the RRC connection. The RRC connection resume module is further configured to: if the first RRC connection resume request involves data transmission, perform the reestablishment of the PDCP layer before the second RRC connection resume request for resuming the RRC connection is transmitted to the network side device. The RRC connection resume module is further configured to: if the first RRC connection resume request involves data transmission, perform the reestablishment of the PDCP layer after the second RRC connection resume request for resuming the RRC connection is transmitted to the network side device.

In some examples, the RRC connection resume module may further be configured to restore a state of the PDCP layer, and reestablish a PDCP entity for a data radio bearer and/or a signaling radio bearer.

In some examples, the device may further comprise a header compression resetting module, configured to reset header compression protocol content for a data radio bearer configured with header compression.

In some examples, the RRC connection resume module may further reestablish the PDCP layer upon occurrence of the following cases: a related timer for controlling RRC connection resume expires; a cell reselection occurs during RRC connection resume; and a response refusing to resume the RRC connection is received from the network side device.

Another aspect of the embodiments of the present disclosure provides a device for transmitting data. The device comprises a memory and a processor. The memory is configured to store executable instructions. The processor is configured to execute the executable instructions stored in the memory to execute the foregoing method.

Another aspect of the embodiments of the present disclosure provides a memory device carrying thereon a computer program which, when executed by a processor, enables the processor to execute the foregoing method.

Reestablishing the PDCP layer enables the UE and, for example, a base station to perform confidential operations by using an agreed encrypted input, solving a decoding failure caused by out-of-sync COUNT values of the UE and the base station.

BRIEF DESCRIPTION OF THE DRAWINGS

In order for those skilled in the art to fully understand the present invention and advantages thereof, the following description is provided in conjunction with the accompanying drawings.

DETAILED DESCRIPTION

Figure 1:
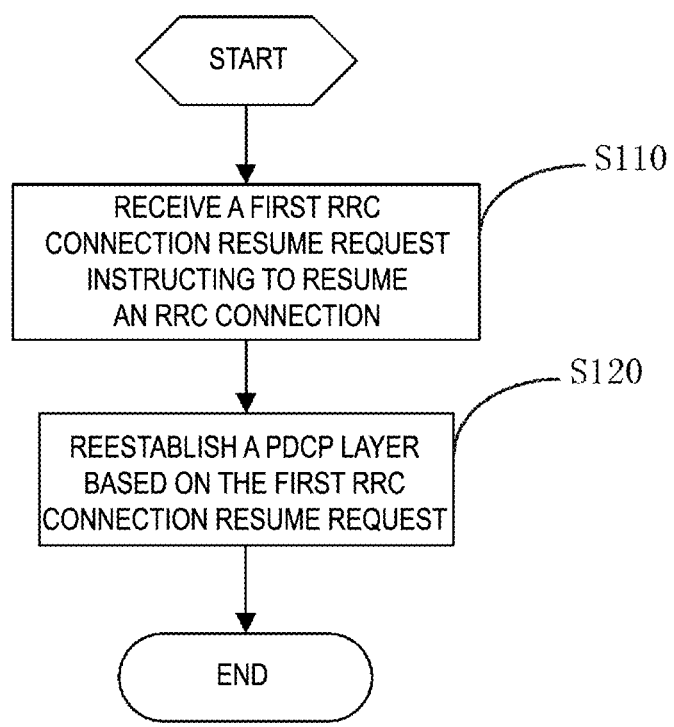
FIG. 1 is a brief flowchart of a method for transmitting data according to an embodiment of the present invention.

The following describes the present invention in detail with reference to the accompanying drawings and specific embodiments. It should be noted that the present invention is not limited to the specific embodiments described below. In addition, for simplicity, detailed description of the prior art not directly related to the present invention is omitted to avoid confusion with respect to the understanding of the present invention.

A plurality of embodiments according to the present invention are specifically described below by using an LTE mobile communications system and its subsequent evolved version as an exemplary application environment. However, it should be noted that the present invention is not limited to the following embodiments, but instead is applicable to other wireless communications systems, such as a future 5G cellular communications system, for example, an NR, and is applicable to other base stations and terminal devices, such as those supporting eMTC, MMTC, and so on.

Prior to the specific description, several terms mentioned in the present invention are illustrated as follows. The terms involved in the present invention shall have the meanings set forth below, unless otherwise indicated.

UE: User Equipment, user equipment/terminal device
MAC: Medium Access Control, medium access control
RRC: Radio Resource Control, radio resource control
PDCP: packet data convergence protocol
RB: radio bearer
DRB: data radio bearer
SRB: signaling radio bearer
SN: sequence number
HFN: hyper frame number In the prior art, UE may be in an idle state or a connected state depending on whether an air interface connection exists. When the UE has data to transmit, preferably the UE needs to enter the connected state from the idle state first. In order to reduce data transmission latency, an intermediate state is introduced. In this state, although the UE is in a disconnected idle state on an air interface, an access stratum context (AS context) of the UE is stored in a base station and the UE. In addition, in this state, the UE is assigned a resume ID, which is an identity used by the UE to resume an RRC connection. This intermediate state can be considered as a connection suspended state, or it can be considered as a connection inactive state. This intermediate state can be considered as a sub-state of the idle state, or be considered as a new state separated from the idle state and the connected state.

In this intermediate state, the UE is in fact in a disconnected state on the air interface; yet, the connection between the UE and a core network may be in an active state or in a suspended state. When the UE has data to transmit, the UE sends to the base station an RRC connection resume request message carrying the resume ID. After receiving the request, the base station can quickly instruct, based on a previous configuration, the UE to enter the connected state so as to transmit the data.

In order to further reduce data transmission latency, early data transmission (EDT) currently in discussion is attempting to enable the UE to transmit data packets in the disconnected state and prevents the UE from entering the connected state. One implementation of this scheme is that the UE transmits data in the disconnected state. The UE may transmit already generated data packets to the base station while initiating an RRC connection resume request. One implementation manner may be that the data packets to be transmitted and the RRC connection resume request message to be transmitted to the base station are transmitted on the same uplink resources; or it may be that the base station schedules for or allocates to the UE uplink resources for transmitting the data packets and uplink resources for transmitting the RRC connection resume request message at the same time. Once the base station accepts the request of the UE, the base station can restore the context of the UE and transmit the received data packets to the corresponding core network according to the context. If there is no subsequent data exchange, the base station can instruct the UE to again enter the suspended state or inactive state. Thus, the UE can complete data transmission without entering the connected state, greatly reducing transmission latency.

Embodiment 1

FIG. 1 is a brief flowchart of a method for transmitting data at UE according to an embodiment of the present invention.

As shown in FIG. 1, the method comprises an operation of S110: receiving a first RRC connection resume request instructing to resume an RRC connection.

The first RRC connection resume request herein may be implemented in any manner, for example, may be implemented by using information exchange between communication protocol layers, but is not limited thereto; and it may also be implemented by using any other possible information exchange manner.

The method further comprises an operation of S120: reestablishing a PDCP layer based on the first RRC connection resume request.

Reestablishing the PDCP layer enables the UE and, for example, a base station to perform confidential operations by using an agreed encrypted input, solving a decoding failure caused by out-of-sync COUNT values of the UE and the base station.

In some examples, the method may further comprise transmitting to a network side device a second RRC connection resume request for resuming the RRC connection. The above reestablishing a PDCP layer based on the first RRC connection resume request may comprise: if the first RRC connection resume request involves data transmission, performing the reestablishment of the PDCP layer before the second RRC connection resume request for resuming the RRC connection is transmitted to the network side device. The above reestablishing a PDCP layer based on the first RRC connection resume request may further comprise: if the first RRC connection resume request does not involve data transmission, performing the reestablishment of the PDCP layer after the second RRC connection resume request for resuming the RRC connection is transmitted to the network side device.

In some examples, the reestablishing the PDCP layer may comprise: restoring a state of the PDCP layer, and reestablishing a PDCP entity for a data radio bearer and/or a signaling radio bearer.

In some examples, the method may further comprise: resetting header compression protocol content for a data radio bearer configured with header compression.

In some examples, the method may further comprise reestablishing the PDCP layer upon occurrence of the following cases: a related timer for controlling RRC connection resume expires; a cell reselection occurs during RRC connection resume; and a response (for example, a resume RRC reject message) refusing to resume the RRC connection is received from the network side device.

Herein, the user equipment may be a mobile terminal (for example, a cell phone, a PDA, a mobile phone, a notebook computer, a tablet device, a laptop device, etc.), a fixed device (for example, a fixed phone, a desktop computer, etc.), or any other devices capable of communicating with the network side device. The technical solution of the embodiment of the present invention is not limited by specific types of the user equipment.

Herein, the network side device may be a base station, any other existing or future developed devices capable of implementing functions of a base station with different names (for example, an NB, an eNB, an AP, etc.), or any existing or future developed devices capable of storing an access stratum context of the UE and performing encrypted data communication with the UE. Although the specific technical solution is described herein by using a base station as an example, the scope of the present invention is not limited thereto.

Embodiment 2

Figure 2:
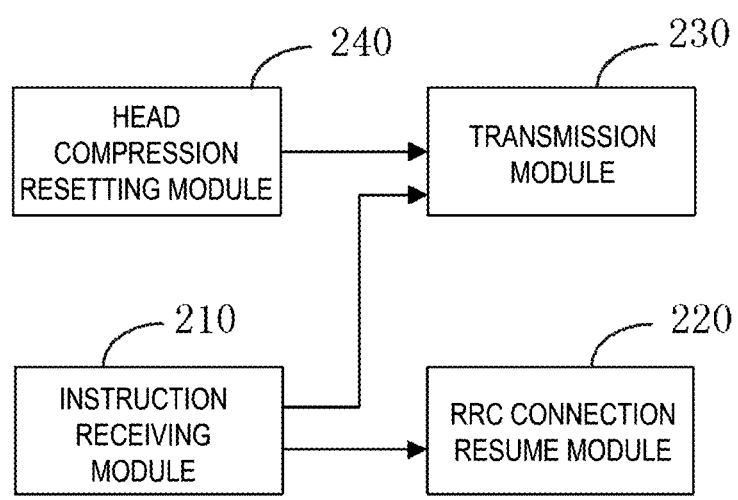
FIG. 2 is a brief block diagram of a device for transmitting data corresponding to the method shown in FIG. 1 according to an embodiment of the present invention.

FIG. 2 is a brief block diagram of a device for transmitting data corresponding to the method shown in FIG. 1 according to an embodiment of the present invention.

As shown in FIG. 2, the device comprises an instruction receiving module 210 and an RRC connection resume module 220.

The instruction receiving module 210 is configured to receive a first RRC connection resume request instructing to resume an RRC connection.

The RRC connection resume module 220 is configured to reestablish a PDCP layer based on the first RRC connection resume request received by the instruction receiving module 210.

Reestablishing the PDCP layer enables the UE and, for example, a base station to perform confidential operations by using an agreed encrypted input, solving a decoding failure caused by out-of-sync COUNT values of the UE and the base station.

The device shown in FIG. 2 may further comprise a transmission module 230, configured to transmit to a network side device a second RRC connection resume request for resuming the RRC connection. In this case, the RRC connection resume module 220 is further configured to: if the first RRC connection resume request involves data transmission, perform the reestablishment of the PDCP layer before the second RRC connection resume request for resuming the RRC connection is transmitted to the network side device. The RRC connection resume module 220 may further be configured to: if the first RRC connection resume request involves data transmission, perform the reestablishment of the PDCP layer after the second RRC connection resume request for resuming the RRC connection is transmitted to the network side device.

In some examples, the RRC connection resume module 220 may further be configured to restore a state of the PDCP layer, and reestablish a PDCP entity for a data radio bearer and/or a signaling radio bearer.

In some examples, the device may further comprise a header compression resetting module 240, configured to reset header compression protocol content for a data radio bearer configured with header compression.

In some examples, the RRC connection resume module 220 may further reestablish the PDCP layer upon occurrence of the following cases: a related timer for controlling RRC connection resume expires; a cell reselection occurs during RRC connection resume; and a response refusing to resume the RRC connection is received from the network side device.

The device for transmitting data described above may be user equipment. Herein, the user equipment may be a mobile terminal (for example, a cell phone, a PDA, a mobile phone, a notebook computer, a tablet device, a laptop device, etc.), a fixed device (for example, a fixed phone, a desktop computer, etc.), or any other devices capable of communicating with the network side device. The technical solution of the embodiment of the present invention is not limited by specific types of the user equipment.

Herein, the network side device may be a base station, any other existing or future developed devices capable of implementing functions of a base station with different names (for example, an NB, an eNB, an AP, etc.), or any existing or future developed devices capable of storing an access stratum context of the UE and performing encrypted data communication with the UE. Although the specific technical solution is described herein by using a base station as an example, the scope of the present invention is not limited thereto.

Embodiment 3

The technical solutions of the above Embodiments 1 and 2 will be elaborated in what follows with reference to the following embodiments. It should be noted that the scope of the invention is not limited by the elaborated specific details. Modifications made to the following specific details in the art based on the disclosure of the embodiments of the present invention are also within the scope of the present invention.

In one solution of the embodiment of the present invention, UE always reestablishes a PDCP layer when initiating EDT, such that an encrypted input used when the UE performs EDT transmission may be other encrypted inputs (for example, an initial encrypted input) agreed upon between the UE and the base station. Accordingly, the base station knows that the UE always uses the initial or agreed encrypted input when the UE performs transmission using EDT, thereby avoiding the out-of-sync problem during decryption.

The UE may reestablish the PDCP layer before or after transmitting an RRC connection resume request. The specific process may be as follows:

Step 1: The UE receives, from an upper layer, an instruction to request for resuming an RRC connection.

The "upper layer" and "lower layer" described herein respectively refer to protocol layers that are higher and lower than the protocol layer currently performing operations. The division of the protocol layers can be based, for example, on a hierarchical structure defined in a used communication protocol. For example, in the above step, the current layer may be an RRC layer, and the upper layer may be any protocol layer higher than the RRC layer, such as a non-access stratum (NAS) layer; and the lower layer may be any one or a plurality of PDCP, RLC, and MAC.

When the request for resuming the RRC connection involves data transmission, for example, the request is related to or used for data transmission, the upper layer requests to transmit data during the resume of the RRC connection, the upper layer requests to resume the RRC connection in order for data transmission, or the request instructs to transmit data during the resume of the RRC connection, then step 2 is performed.

If the request does not involve data transmission, i.e., only requesting to resume the RRC connection, then step 3 is performed.

Step 2: After receiving the request from the upper layer or before transmitting to the base station a related message for resuming the RRC connection (for example, an RRC connection resume request in the prior art or a message for resuming the RRC connection dedicated to data transmission), the UE reestablishes a PDCP entity for a DRB, or referred to as reestablishment a PDCP layer. The reestablishment the PDCP entity may be that the UE restores/recovers the state of the PDCP, and reestablishes a PDCP entity for a DRB, or a DRB and an SRB, or all RBs.

The restoring/recovering the state of the PDCP herein may be, for example, restoring the PDCP to a state prior to the suspended or inactive state.

The DRB refers to a radio bearer used for data transmission. Each DRB has its corresponding PDCP entity. Reestablishing the PDCP entity may comprise setting parameters related to the encrypted input to zero or initial values, such as setting the parameters Next_PDCP_TX_SN and TX_HFN to 0. In some examples, stored PDCP SDUs and PDCP PDUs may further be discarded. Alternatively, during the PDCP reestablishment process, an encryption algorithm and key provided by the upper layer are used.

The SRB refers to a radio bearer used for signaling transmission. The SRB also has a corresponding PDCP entity. In the process of reestablishing the PDCP entity of the SRB, in addition to using the encryption algorithm and key provided by the upper layer, an integrity protection algorithm is further required. This is because SRBs enforce integrity protection.

The DRB involved herein may be all DRBs contained in the UE. In some examples, the DRBs may be only DRBs related to the data currently transmitted. That is, a PDCP entity is reestablished for the DRB related to the transmitted data. For example, if the data requested for transmission is sent via DRB1, only a PDCP entity of DRB1 is reestablished. The other DRBs can continue to be in a suspended state.

In addition to reestablishing the PDCP, the UE may further instruct the lower layer to use a stored AS context of the UE; and optionally, header compression protocol content for a DRB configured with header compression is reset.

Step 3: If the upper layer only requests to resume the RRC connection, and the request does not involve or is not to be used for data transmission, after receiving the RRC connection resume message transmitted by the base station, the UE restores/recovers the state of the PDCP, and reestablishes PDCP entities for an SRB and a DRB for future data transmission. Herein, the RRC connection resume message is a response message for the RRC connection resume request message transmitted by the UE. The moment when the UE receives the RRC connection resume message transmitted by the base station can be considered to occur after the UE transmits the RRC connection resume request message.

Embodiment 4

In addition to reestablishing the PDCP when EDT is initiated as described in Embodiment 3, the UE may also reestablish the PDCP after a data transmission failure occurs, such as, but not limited to, the following cases:

Case 1: A related timer for controlling the resume of the RRC connection expires. This timer may be, for example, a timer that controls the time for attempting to resume the RRC connection. When the RRC connection resume procedure exceeds this time, it can be determined that the RRC connection resume fails. Naturally, this embodiment of the present invention is not limited thereto; and the timer may also be in another form that controls the resume of the RRC connection.

Case 2: A cell reselection occurs during the RRC connection resume procedure.

Case 3: The UE receives a message refusing to resume the RRC connection (such as a resume RRC reject message).

In the above three cases, the UE can determine that data transmission using the resumed RRC connection has failed; and then the UE can reestablish the PDCP for a DRB and an SRB. Optionally, the UE may further notify the upper layer of the failure in resuming the RRC connection for data transmission.

Cases 1 and 2 are: the UE starts a timer related to the RRC connection resume procedure and the timer expires; or the UE reselects a cell while the timer is still running. In these cases,
 if the process of the UE resuming the RRC connection involves or is to be used for data transmission, or is related to data transmission, i.e., the UE receives, from the upper layer, an instruction requesting to resume the RRC connection and data is transmitted in the RRC connection resume request, then the UE reestablishes the PDCP for a DRB and an SRB; and optionally, the UE may notify the upper layer of the failure in resuming the RRC connection for data transmission.
 If the process of the UE resuming the RRC connection does not involve or is not to be used for data transmission, or is not related to data transmission, i.e., the UE receives, from the upper layer, an instruction requesting to resume the RRC connection and data transmission is not required in the RRC connection resume request, then the UE only resets a MAC layer and reestablishes an RLC layer without having to reestablish the PDCP for any RB.

With regard to case 3, it may be specifically that the UE receives an RRC connection reject message in which the RRC connection resume request of the UE is rejected, then when the reject message is received or after the reject message is received:
 if the reject message is a response to an RRC connection resume request message related to data transmission, or a response to an RRC connection resume request message transmitted together with data, then the UE can reestablish the PDCP for a DRB, or a DRB and an SRB, or all RBs. Optionally, the UE may further notify the upper layer of the failure in resuming the RRC connection for data transmission.
 If the reject message is a response to an RRC connection resume request message unrelated to data transmission, or a response to an RRC connection resume request message without data transmission, the UE resets the MAC layer, and may not have to reestablish the PDCP for any RB (DRB or SRB).

Embodiment 5

Embodiment 5 solves the problems involved in the three cases in Embodiment 4 by means of RRC connection re-establishment. When the RRC connection resume procedure accompanying with data transmission fails, the UE may trigger or initiate RRC connection re-establishment. As described in Embodiment 4, the UE may determine that transmitting data using the resumed RRC connection fails in three cases. Cases 1 and 2 are: the UE starts a timer related to the RRC connection resume procedure and the timer expires; or the UE reselects a cell while the timer is still running. In this case,
 if the resume of the RRC connection by the UE involves or is to be used for data transmission, or is related to data transmission, then the UE triggers or initiates an RRC connection re-establishment process. An RRC connection re-establishment request message carries a resume ID (a UE ID used for resuming the RRC connection) and shortResumeMAC-I (an authentication-related token). Specifically, when setting the content of the connection re-establishment request message, the UE may set the UE ID for connection re-establishment to at least contain the resume ID and the optional shortResume MAC-I.
 If the resume of the RRC connection by the UE does not involve or is not to be used for data transmission, or is not related to data transmission, then the UE does not trigger a connection re-establishment process; and the UE may return to an idle state or perform an action of leaving a connected state.

Embodiment 6

Figure 3:
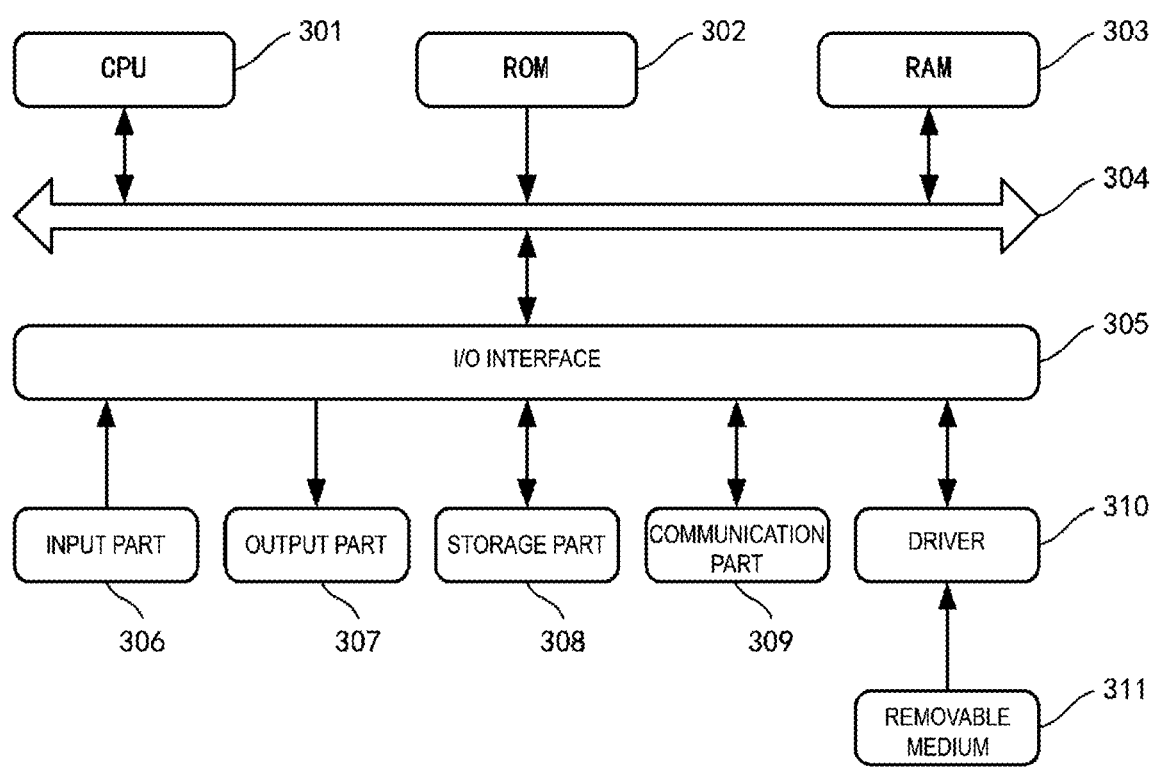
FIG. 3 is a schematic block diagram of a device for transmitting data according to an embodiment of the present disclosure.

FIG. 3 is a schematic block diagram of a device for transmitting data according to an embodiment of the present disclosure. The device shown in FIG. 3 is only an example, and should not impose any limitation on the functions and scope of use of the embodiment of the present disclosure.

As shown in FIG. 3, the device 300 according to this embodiment comprises a central processing unit (CPU) 301, which can execute various appropriate actions and processes according to a program stored in a read-only memory (ROM) 302 or loaded into a random access memory (RAM)

303 from a storage part 308. In the RAM 303, various programs and data required for the operations of the device 300 are also stored. The CPU 301, the ROM 302, and the RAM 303 are connected to one another via a bus 304. An input/output (I/O) interface 305 is also connected to the bus 304.

The device 300 may further comprise one or a plurality of the following components connected to the I/O interface 305: an input part 306 comprising a keyboard or a mouse, etc.; an output part 307 comprising, for example, a cathode ray tube (CRT) or a liquid crystal display (LCD), a speaker, etc.; a storage part 308 comprising a hard disk and the like; and a communication part 309 comprising a network interface card such as a LAN card or a modem. The communication part 309 performs communication processing via a network such as the Internet. A driver 310 is also connected to the I/O interface 305 according to needs. A removable medium 311, such as a magnetic disk, an optical disc, a magneto-optical disk, or a semiconductor memory and the like, is installed on the driver 310 according to needs, such that a computer program read therefrom is loaded into the storage part 308 as necessary.

In particular, according to an embodiment of the present disclosure, the process described above with reference to the flowchart may be implemented as a computer software program. For example, an embodiment of the present disclosure comprises a computer program product comprising a computer program carried on a computer-readable medium; the computer program comprises a program code for executing the method shown in the flowchart. In such an embodiment, the computer program may be downloaded and installed from a network by means of the communication part 309, and/or installed by means of the removable medium 311. When the computer program is executed by the central processing unit (CPU) 301, the aforementioned functions defined in the device of the embodiments of the present disclosure are executed.

It should be noted that the computer-readable medium shown in the present disclosure may be a computer-readable signal medium, a computer-readable storage medium, or any combination thereof. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but not limited to: an electrical connection with one or a plurality of wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing thereon a program that can be used by an instruction execution system, apparatus, or device, or by a combination thereof. In the present disclosure, the computer-readable signal medium may comprise a data signal included in a baseband or propagated as part of a carrier wave, and which carries a computer-readable program code. Such a propagated data signal may be in many forms, including, but not limited to, an electromagnetic signal, an optical signal, or any suitable combination thereof. The computer-readable signal medium may also be any computer-readable medium other than a computer-readable storage medium; and the computer-readable medium can transmit, propagate, or transfer a program for use by an instruction execution system, apparatus, or device, or by a combination thereof. A program code embodied on the computer-readable medium may be transmitted using any appropriate media, including, but not limited to: a wireless connection, a wire, an optical fiber cable, or an RF signal, etc., or any suitable combination thereof.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies replacing existing integrated circuits emerge from advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the suitable combinations of the technical means disclosed in different embodiments are also included within the technical scope of the present invention. In addition, components with the same effect described in the above embodiments may be replaced with one another.

The invention claimed is:

1. A user equipment (UE) comprising:
a processor; and
a memory, wherein the memory stores instructions that cause the processor to:
determine whether a procedure to be performed is a first procedure or a second procedure, based on whether the UE transmits an RRCConnectionResumeRequest message while performing an early data transmission or the UE transmits the RRCConnectionResumeRequest message without performing the early data transmission,
perform the first procedure, in a case that the UE transmits the RRCConnectionResumeRequest message while performing the early data transmission, wherein the first procedure is a procedure during which, upon an upper layer requests a resumption of a radio resource control (RRC) connection, the UE restores a packet data convergence protocol (PDCP) state, re-establishes PDCP entities for all data radio bearers (DRB), indicates to lower layers that a stored UE access stratum (AS) context is used, and resets a header compression protocol context for the DRBs configured with the header compression protocol, before transmitting the RRCConnectionResumeRequest message;
perform the second procedure, in a case that the UE transmits the RRCConnectionResumeRequest message without performing the early data transmission, wherein the second procedure is a procedure during which, upon the upper layer requests a resumption of the RRC connection, the UE receives an RRCConnectionResume message, restores the PDCP state, and re-establishes the PDCP entities for all DRBs, after transmitting the RRCConnectionResumeRequest message.

2. A method performed at user equipment (UE) comprising:
determine whether a procedure to be performed is a first procedure or a second procedure, based on whether the UE transmits an RRCConnectionResumeRequest message while performing an early data transmission or the UE transmits the RRCConnectionResumeRequest message without performing the early data transmission,
perform the first procedure, in a case that the UE transmits the RRCConnectionResumeRequest message while performing the early data transmission, wherein the first procedure is a procedure during which, upon an upper layer requests a resumption of a radio resource control (RRC) connection, the UE restores a packet data convergence protocol (PDCP) state, re-establishes PDCP entities for all data radio bearers (DRBs), indicates to lower layers that a stored UE access stratum (AS) context is used, and resets a header compression protocol context for the DRBs configured with the header compression protocol, before transmitting the RRCConnectionResumeRequest message; and
perform the second procedure, in a case that the UE transmits the RRCConnectionResumeRequest message without performing the early data transmission, wherein the second procedure is a procedure during which, upon the upper layer requests a resumption of the RRC connection, the UE receives an RRCConnectionResume message, restores the PDCP state, and re-establishes the PDCP entities for all DRBs, after transmitting the RRCConnectionResumeRequest message.

* * * * *